(12) United States Patent
Flomen et al.

(10) Patent No.: US 6,174,580 B1
(45) Date of Patent: Jan. 16, 2001

(54) SAUSAGE CASING PACKAGING

(75) Inventors: Edward Flomen; George Ilkich, both of Montreal (CA)

(73) Assignee: Natpack Tubing, Inc., Quebec (CA)

( * ) Notice: Under 35 U.S.C. 154(b), the term of this patent shall be extended for 0 days.

(21) Appl. No.: 09/329,790

(22) Filed: Jun. 10, 1999

Related U.S. Application Data

(63) Continuation of application No. PCT/CA97/00947, filed on Dec. 9, 1997.

(30) Foreign Application Priority Data

Dec. 10, 1996 (JP) .................................... 8-329863

(51) Int. Cl.⁷ .................................... A22C 13/02
(52) U.S. Cl. .................... 428/43; 428/36.9; 206/802; 452/32
(58) Field of Search .................... 428/43, 36.9; 206/802; 452/32

(56) References Cited

U.S. PATENT DOCUMENTS 3,115,240 * 12/1963 Flomen et al. ................ 206/446
3,826,852 * 7/1974 Levaco et al. ................ 206/802

FOREIGN PATENT DOCUMENTS 296 09 651    8/1986   (DE) .

* cited by examiner

*Primary Examiner*—Alexander Thomas
(74) *Attorney, Agent, or Firm*—Venable; Michael A. Gollin

(57) ABSTRACT

A holder for retaining shirred gut sausage casing comprising an elongated, flexible, self-supporting, flattened tube having a longitudinal uninterrupted slit. The flattened tube comprises a pair of opposed parallel walls terminating in longitudinal edges at the slit. The flattened tube is formed from a relatively firm, flexible sheet material having a low coefficient of friction.

7 Claims, 5 Drawing Sheets

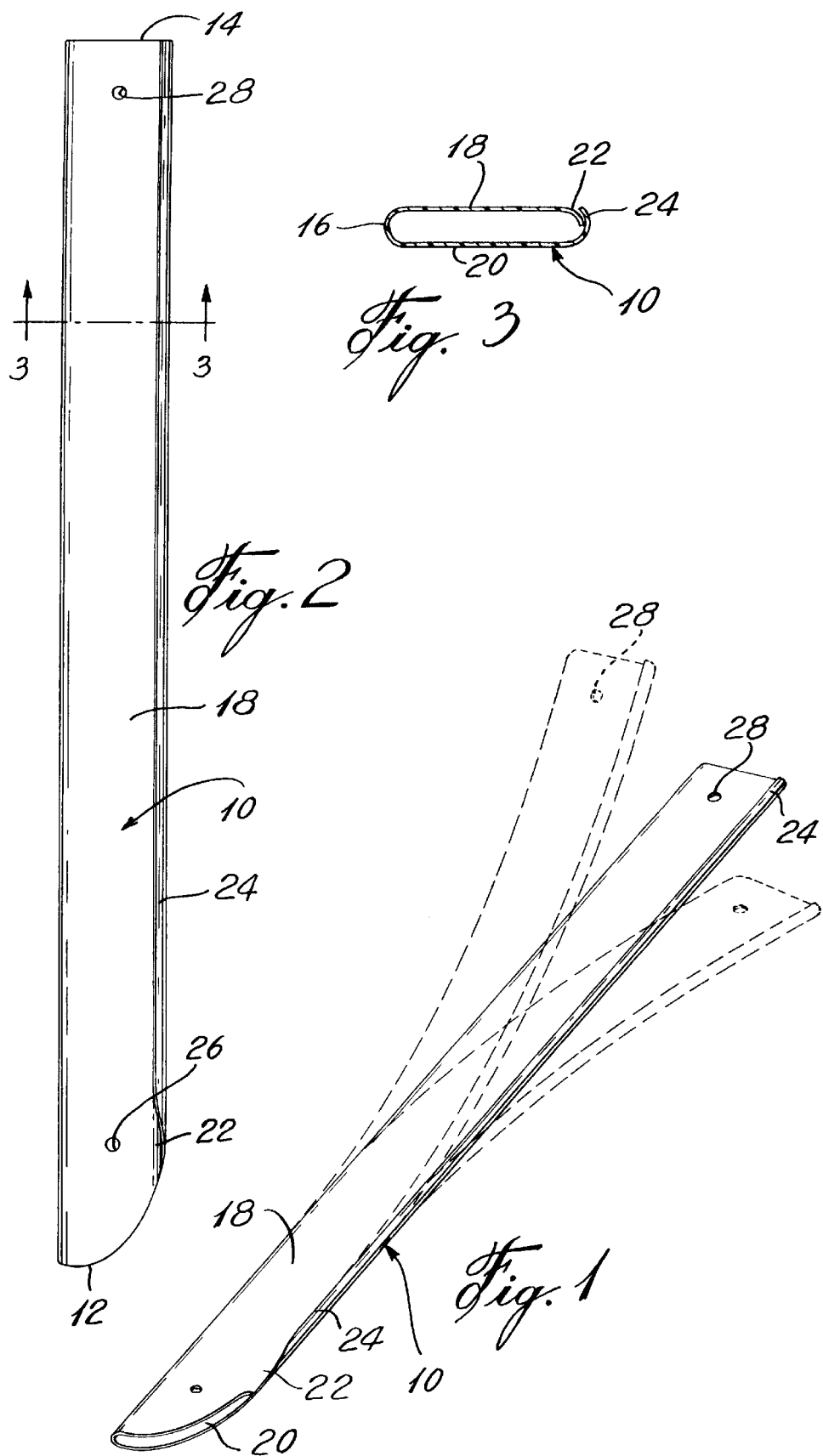

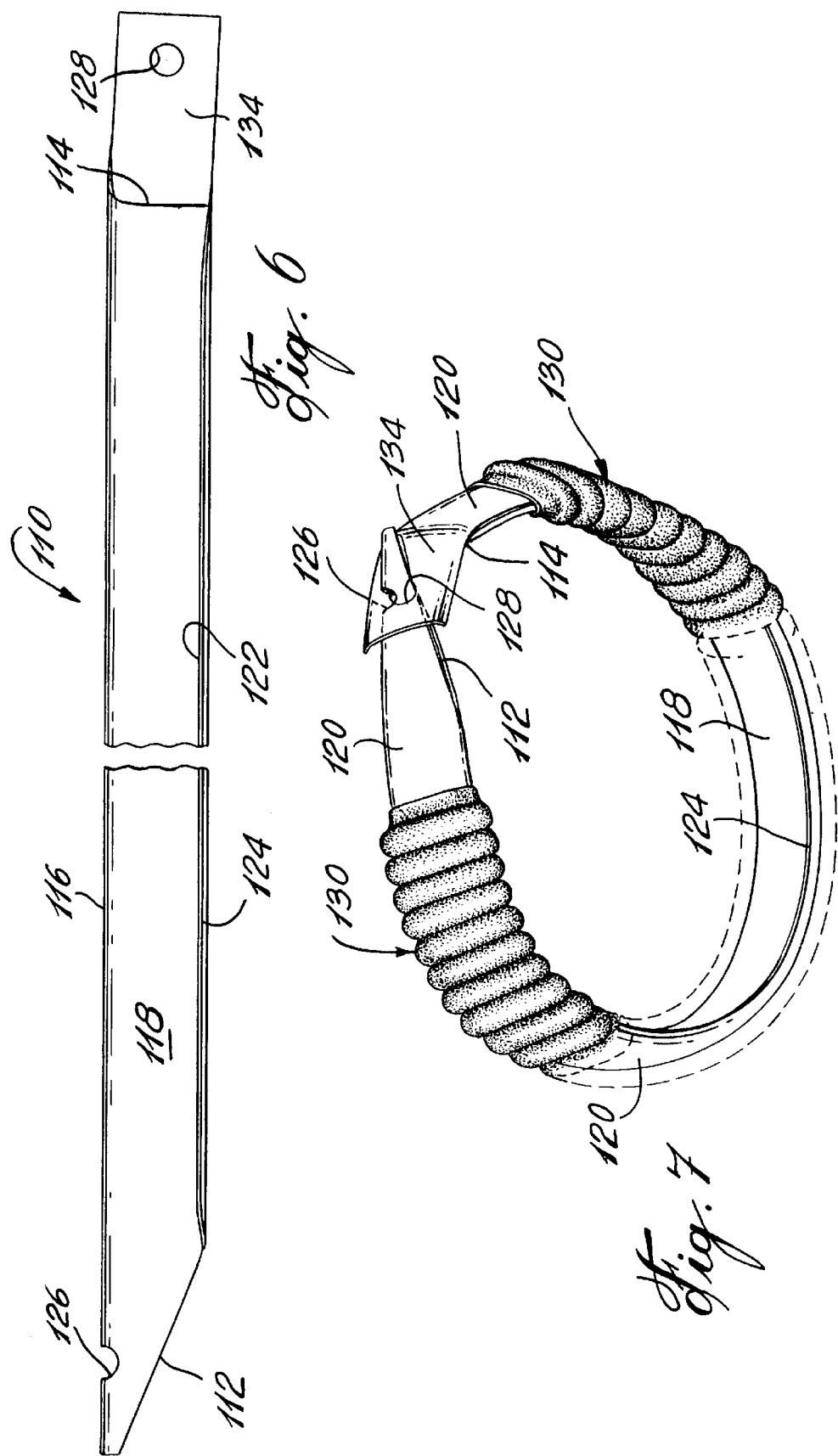

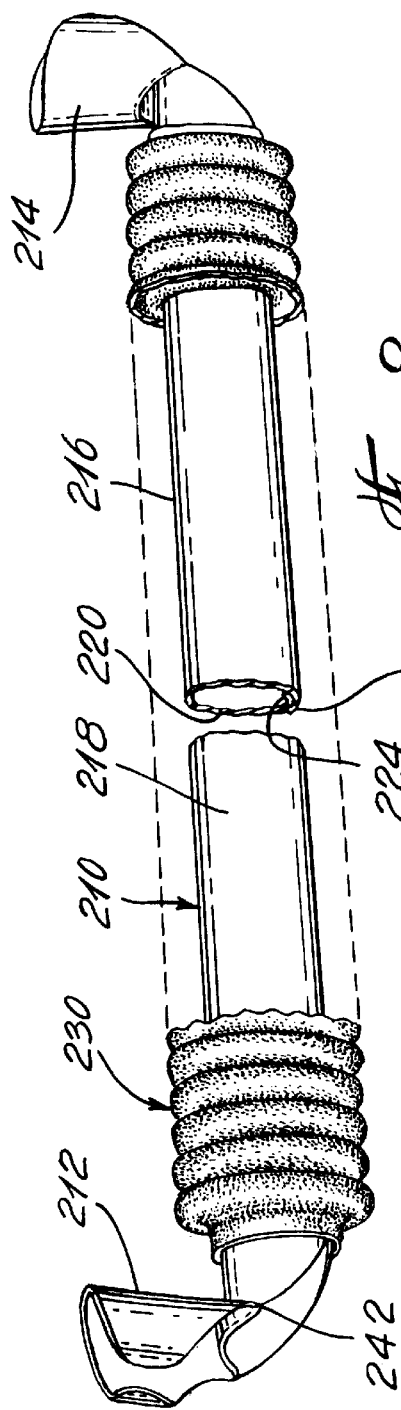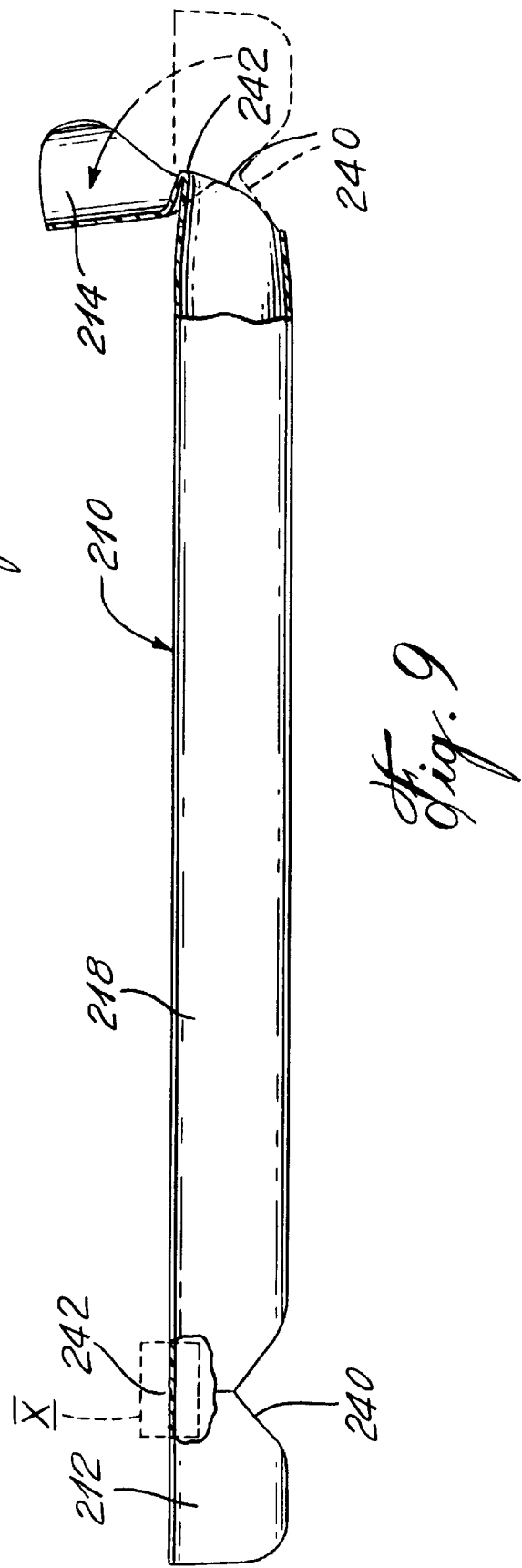

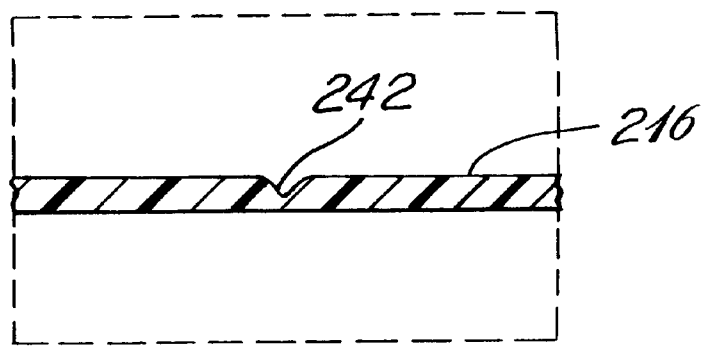
Fig. 10
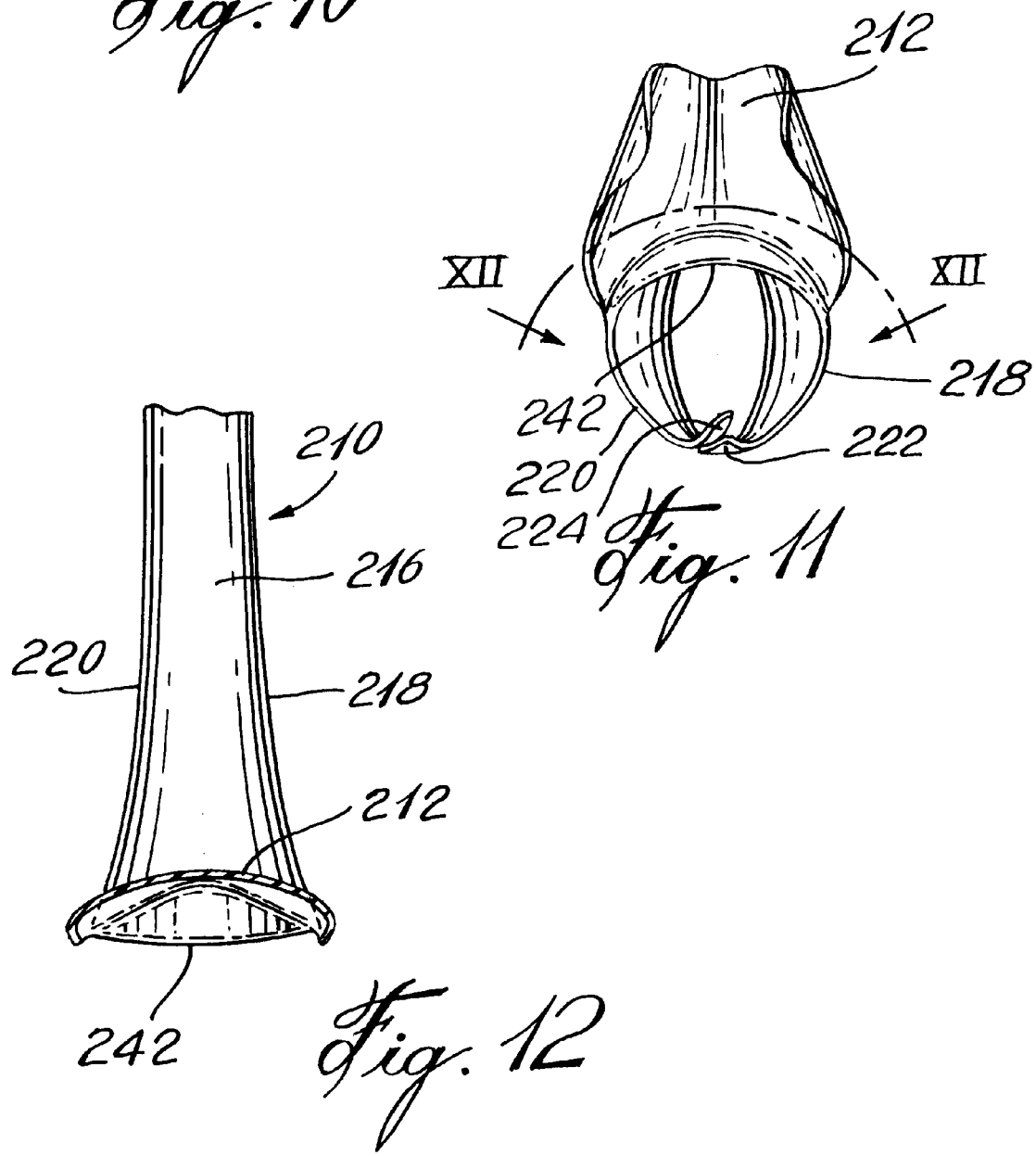
Fig. 11
Fig. 12

SAUSAGE CASING PACKAGING

CROSS-REFERENCE TO RELATED APPLICATION

This application is a continuation application of International Application No. PCT/CA97/00947, filed Dec. 9, 1997 (09.12.97).

BACKGROUND OF THE INVENTION

1. Field of the Invention

The present invention relates to packaging for natural gut sausage casing, and more particularly, to a holder for such casing.

2. Description of the Prior Art

The sausage industry has been using a two-piece holder for natural gut casing and the packaging thereof. This two-piece holder is best described in U.S. Pat. No. 3,115,240, issued Dec. 24, 1963 to Edward Flomen et al. The holder, in accordance with the above United States patent, includes an elongated, flexible, self-supporting, flattened tube having opposed parallel walls. The flattened tube is reinforced by a stiffener insert adapted to be placed in the flattened tube. The flattened tube is disposable, thereby reducing the cost otherwise necessitated by the sanitation of the holder. Reference is made to this United States patent for a description of the particular problems faced when handling natural gut casing and the limitations encountered with conventional packaging for such products.

The two-piece holder is not popular in all markets. For instance, in the Japanese market, a reusable, one-piece, semi-rigid, cylindrical tube is commonly used. However, the tube must be sanitized before it can be reused. The use of such a holder requires that the sausage making plant be close to the supplier of natural gut casing in view of the back-and-forth transportation of the holders.

SUMMARY OF THE INVENTION

It is an aim of the present invention to provide a one-piece disposable holder for use in packaging natural gut sausage casing.

It is a further aim of the present invention to have an improved holder that can replace the one-piece reusable holder.

A construction in accordance with the present invention comprises an elongated, self-supporting, flattened, slit tube having a pair of opposed, somewhat parallel walls with overlapping longitudinal edges at the slit. The material of the tube is selected from a flexible self-supporting sheet material having a low coefficient of friction.

It has been found that, by providing the flattened tube having a continuous slit parallel to the axis of the tube, a firmer wall construction could be maintained while providing the necessary flexibility to the holder.

A preferred material for the flattened slit tube is polyethylene.

It has been found that a one-piece holder of relatively thin polyethylene material having a U-shaped cross-section having a bight portion and a pair of opposed parallel walls with inwardly curved free edges representing a flattened slit tube provides an ideal disposable holder. One end of the holder may be tapered in order to facilitate the loading of a length of natural gut onto the holder. In view of the flexible wall construction and the uninterrupted slit formed in the otherwise flattened tube, the holder may be easily placed on a shirring horn. In view of the relative stiffness of the holder, the holder tube will not have a tendency of "riding up" on the shirring horn.

In another embodiment of the present invention, the flattened slit tube has an extension from each end thereof, with one extension having a tapered end, and the two extensions have cooperating means for retaining the two end extensions together to form a loop. Thus, a casing can be mounted on the flattened slit tube on the shirring horn, and then the flattened tube can be formed in a loop by coupling the end extensions for the purpose of forming a transportable pack.

In a more specific embodiment, the end extension with the taper is provided with a notch at the bight in order to lock with the edges of the aperture when the end extensions are coupled together, thereby providing the retaining means.

In a still further embodiment of the present invention, end portions of the tube are separated from the holders by a weakened line in the bight portion extending transversely of the axis of the tube to allow the end portions to be flipped over the top of the bight at each end of the tube to provide abutment means for retaining the sausage casing on the tube.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a perspective view of a natural gut casing holder in accordance with the present invention;

FIG. 2 is a side elevation of the holder shown in FIG. 1;

FIG. 3 is a vertical cross-section taken through line 3—3 in FIG. 2;

FIG. 6 is a side elevation showing another embodiment of the present invention;

FIG. 7 is a perspective view showing the holder of FIG. 6 in a different operative position;

FIG. 8 is a perspective view of yet another embodiment of the casing holder in accordance with the present invention;

FIG. 9 is a side elevation thereof, partially in cross-section;

FIG. 10 is an enlarged axial cross-section of the area denoted by X in FIG. 9;

FIG. 11 is an end elevation of the tube in accordance with the embodiment shown in FIG. 8; and FIG. 12 is a cross-section, taken along line XII—XII of FIG. 11.

DESCRIPTION OF THE PREFERRED EMBODIMENTS

Figure 4:
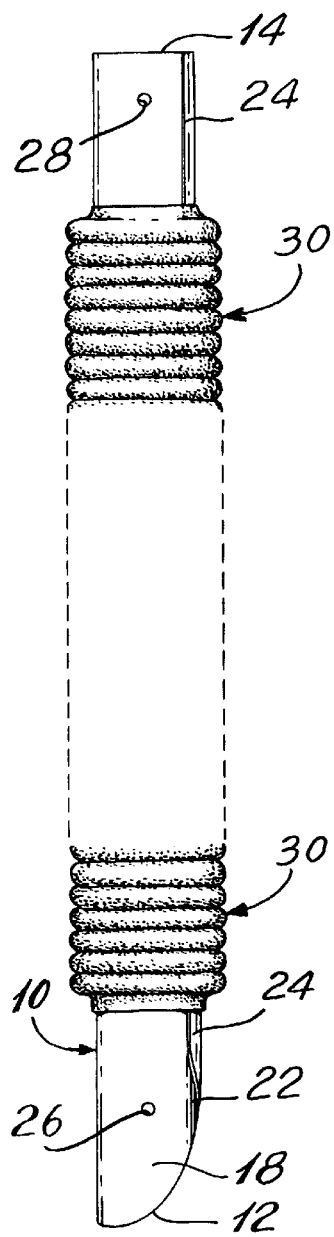
FIG. 4 is a side elevation showing natural gut casing shirred onto the holder of FIG. 1.

Referring now to the drawings and particularly to FIGS. 1 to 3, a holder 10 is shown according to a preferred embodiment. The holder 10 has a tapered end 12, the taper being formed by a gradual convex curve of somewhat semi-parabolic outline. The other end 14 may be a straight edge perpendicular to the axis of the holder 10.

As shown in FIG. 3 in particular, the holder 10 has a bight portion 16 and a pair of opposed parallel side walls 18 and 20 that terminate at inwardly curved edges 22 and 24 respectively that tend to overlap. The holder 10 may be formed from a flat sheet of polyethylene film which has been bent under the influence of heat to form the bight 16. The edges 22 and 24 are also curled to form the inwardly extending edges. The resulting construction of the holder is a flattened tube characterized by an elongated interrupted slit between the edges 22 and 24. The ends 12 and 14 remain open, thus allowing the holder to be easily placed on a shirring horn.

The holder is preferably made of polyethylene or equivalent plastic material with a proper balance of firmness and flexibility. In other words, the holder should be strong enough to be self-supporting and to resist collapsing or "riding up" on the shirring horn when the gut is being shirred onto the holder, without the necessity of using a stiffener as described in U.S. Pat. No. 3,115,240. At the same time, it is preferable that the holder be flexible and relatively soft in order to avoid tearing the gut as it is being shirred and so that the holder can be better manipulated on the shirring horn or various other transportation and delivery operations.

The preferred embodiment of holder 10 has a length of 21 cm. and a width of 2 cm., that is, between the bight 16 and the edges 22 and 24. The overall thickness of the flattened tube is 5 mm. The thickness of the sheet material is 1.4 mm. The polyethylene has a low density at 0.92.

The tapered end 12 facilitates the shirring of the natural gut casing onto the holder 10. The curved or curled edges 22 and 24 tend to overlap, and this avoids any potential aggressive cutting edges which might tear the casing.

Apertures 26 and 28 may also be provided on the respective ends of the holder 10 in order to accommodate laces as will be described.

FIG. 4 shows a holder 10 in accordance with the preferred embodiment on which a natural gut casing 30 has been shirred. For a holder of approximately 21 cm., a length of 15 m. of natural gut can be shirred thereon.

Figure 5:
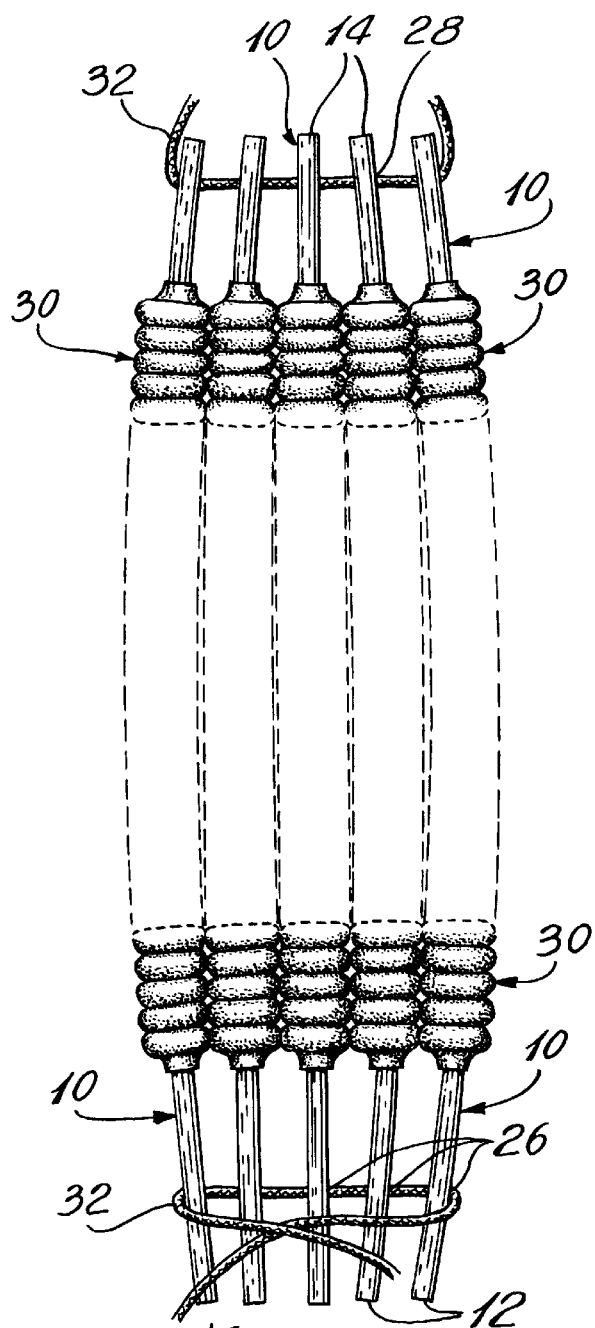
FIG. 5 is a top plan view of a plurality of the holder shown in FIG. 4.

As can be seen from FIG. 5, laces 32 can be threaded through the openings 26 and 28 respectively of a group of holders 10 in order to form a transportable pack.

The embodiment shown in FIG. 6 includes elements which are similar to those in FIGS. 1 to 4, and the references identifying those elements have been raised by 100.

Thus, a holder 110 includes a bight portion 116 and a pair of opposed parallel side walls 118 and 120 that terminate at inwardly curved longitudinal edges 122 and 124 respectively and tend to overlap. One end 112 is tapered and includes a linear edge. A notch 126 is formed in the bight portion of the end 112. At the other end 114, wall 120 extends forming a tail portion 134 with an opening 128. The opening 128 is large enough to receive the tapered portion of end 112, at least up to the notch 126, which fits within the opening 128 as shown in FIG. 7. FIG. 7 shows the holder with a gut casing 130 placed on the holder and the ends of the holder coupled together for transport. Thus, in the case of the present embodiment, laces 32 can be avoided.

As shown in FIGS. 8 through 12, another embodiment includes the holder 210 having a bight portion 216 and a pair of opposed parallel side walls 218 and 220 that terminate at inwardly curved, longitudinal edges 222 and 224 respectively, and tend to overlap.

Each end of the holder 210 is provided with an extension 212 and 214 respectively. These extensions 212 and 214 are identical and thus only one end 212 will be described. A wide notch 240 is defined in each side wall 218 and 220, as shown in FIG. 9. At the remainder of the material between the apices of the notches 240 extending transversely of the holder, particularly at the bight thereof, there is provided a weakened line 242 which provides a folding area. The weakened line 242, as shown in FIG. 10, is formed at the extrusion process for forming the polyethylene tube and while the polyethylene material is still warm. Thus, there is inherent memory in the material causing the tube ends 212 and 214 to naturally assume the upright position, as will be described.

Thus, the tube holder 210 may be mounted to a shirring horn with the end extensions 212 and 214 coaxial with the retainer tube 210. Once the natural gut sausage casing has been placed on the holder 210, the ends 212 and 214 are flipped up so that they are roughly at 90° to the axis of the holder 210 and act as abutments to prevent the casing from ravelling off the end of the holder 210.

We claim:

1. A holder for retaining shirred gut sausage casing comprising an elongated, flexible, self-supporting, flattened tube having a longitudinal uninterrupted slit, the flattened tube comprising a pair of opposed parallel walls terminating in longitudinal edges at the slit, said flattened tube formed from a relatively firm, flexible sheet material having a low coefficient of friction, and wherein the longitudinal edges are inwardly curved to overlap one another.

2. A holder as defined in claim 1, wherein one end thereof has a gradual convex curve providing a tapered end.

3. A holder as defined in claim 1, wherein the sheet material is polyethylene.

4. A holder as defined in claim 1, wherein one end is tapered and has a linear edge and a notch in the bight of the end portion while at the other end of the holder, one of the walls includes an extension with an opening adapted to fit over the other tapered end up to the notch to lock the two ends together.

5. A holder as defined in claim 4, wherein the sheet material is polyethylene.

6. A holder as defined in claim 1, wherein each end of the flattened tube is provided with an extension integral therewith but separated by a weakened line extending transversely of the axis of the tube holder and across the bight thereof, whereby the extension can in one position extend coaxially of the tube and in another position be bent upwardly about the weakened line to form an abutment at 90° to the axis of the holder.

7. A holder as defined in claim 6, wherein notches are provided in the side walls of the holder coincident with the weakened line.

* * * * *